(12) United States Patent
Pflug et al.

(10) Patent No.: US 7,708,661 B2
(45) Date of Patent: May 4, 2010

(54) DECOUPLER ARRANGEMENT

(75) Inventors: Rainer Pflug, Heilsbronn (DE); Steffen Lehmann, Ettlingen (DE); Christian Hauck, Burgthann (DE); Christian Fechler, Karlsruhe (DE); Dimitri Sieber, Ettlingen (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 42 days.

(21) Appl. No.: 11/953,117

(22) Filed: Dec. 10, 2007

(65) Prior Publication Data

US 2008/0139351 A1 Jun. 12, 2008

Related U.S. Application Data

(60) Provisional application No. 60/869,484, filed on Dec. 11, 2006.

(51) Int. Cl.
*F16H 55/14* (2006.01)
*F16H 61/00* (2006.01)

(52) U.S. Cl. .............................. 474/94; 474/70; 474/74; 474/178; 192/104 B; 192/104 C

(58) Field of Classification Search .................. 474/94, 474/95–100, 70; 464/68.7, 68.8; 192/17 D
See application file for complete search history.

(56) References Cited

U.S. PATENT DOCUMENTS

| 2,879,873 | A | * | 3/1959 | Spase ..................... 192/104 C |
| 5,096,035 | A | * | 3/1992 | Bradfield ................ 192/104 B |
| 5,873,785 | A | * | 2/1999 | Friedmann et al. ......... 464/68.7 |
| 6,048,284 | A | * | 4/2000 | Gerhardt et al. ............. 474/178 |
| 6,089,130 | A |   | 7/2000 | Wu |
| 2005/0250607 | A1 | * | 11/2005 | Jansen et al. ................... 474/74 |
| 2007/0037644 | A1 | * | 2/2007 | Mevissen et al. ............. 474/70 |

FOREIGN PATENT DOCUMENTS

| DE | 42 25 304 | 2/1993 |
| DE | 196 52 730 | 6/1997 |
| DE | 199 19 449 | 11/1999 |
| DE | 101 03 082 | 2/2002 |
| DE | 10 2005 029 351 | 1/2006 |
| EP | 05 17 184 | 12/1992 |
| WO | 2008022897 E | 2/2008 |

* cited by examiner

*Primary Examiner*—Robert A Siconolfi
*Assistant Examiner*—San Aung
(74) *Attorney, Agent, or Firm*—Lucas & Mercanti, LLP

(57) ABSTRACT

The decoupler for a drive wheel arrangement for an auxiliary unit of an internal combustion engine has a belt pulley connected to a flexible drive element and a shaft. A damping device is arranged between the shaft and the belt pulley and includes a spring. The belt pulley is connected to a damper cage, which is connected via at least one spring to a damper cage which is positioned such that it can rotate on the shaft.

6 Claims, 2 Drawing Sheets

= Torque flow

DECOUPLER ARRANGEMENT

FIELD OF THE INVENTION

The invention relates to a drive wheel arrangement of a flexible drive, which is configured in particular as a belt drive and is intended for driving auxiliary units of an internal combustion engine. The drive wheel comprises a belt pulley, also referred to as a running surface, operatively connected to the flexible drive element, and also a hub or shaft connected in a rotationally fixed mariner to the drive shaft of the auxiliary unit. A damping device including a spring energy store is arranged between the belt pulley and the shaft in order to reduce torsional vibrations.

DE 42 25 304 A1 discloses a disk-shaped component for a belt drive, in particular for driving an auxiliary unit of an internal combustion engine, which is fastened to the crankshaft of the internal combustion engine. This disk-shaped component comprises a damping device which is provided between an input part fastened to the crankshaft and an output part which can rotate relative to said input part. The input part and the output part here are arranged such that they can rotate with respect to one another via a rolling bearing.

The object of the invention is to develop a drive wheel arrangement of the aforementioned design such that increased rigidity and improved torque transmission are obtained.

The solution to this problem is achieved by the fact that in the operating state the torque within the drive wheel arrangement is transmitted via the running surface or the belt pulley to a first damper cage by a form-fitting connection. From the first outer damper cage, which can also be described as a guide element for the spring energy-storing element, the torque is transmitted via a spring energy-storing element to a further inner damper cage which is mounted rotatably on the shaft. Advantageously, the drive wheel arrangement includes two or more spring energy-storing elements connected in parallel. This construction permits a desired, virtually unrestricted transmission of torques in both directions of rotation. If required, the design according to the invention can also be equipped with an overload clutch which is arranged between the inner damper cage and the generator shaft or unit shaft and which makes it possible to restrict the torque which is to be transmitted.

Figure 1:
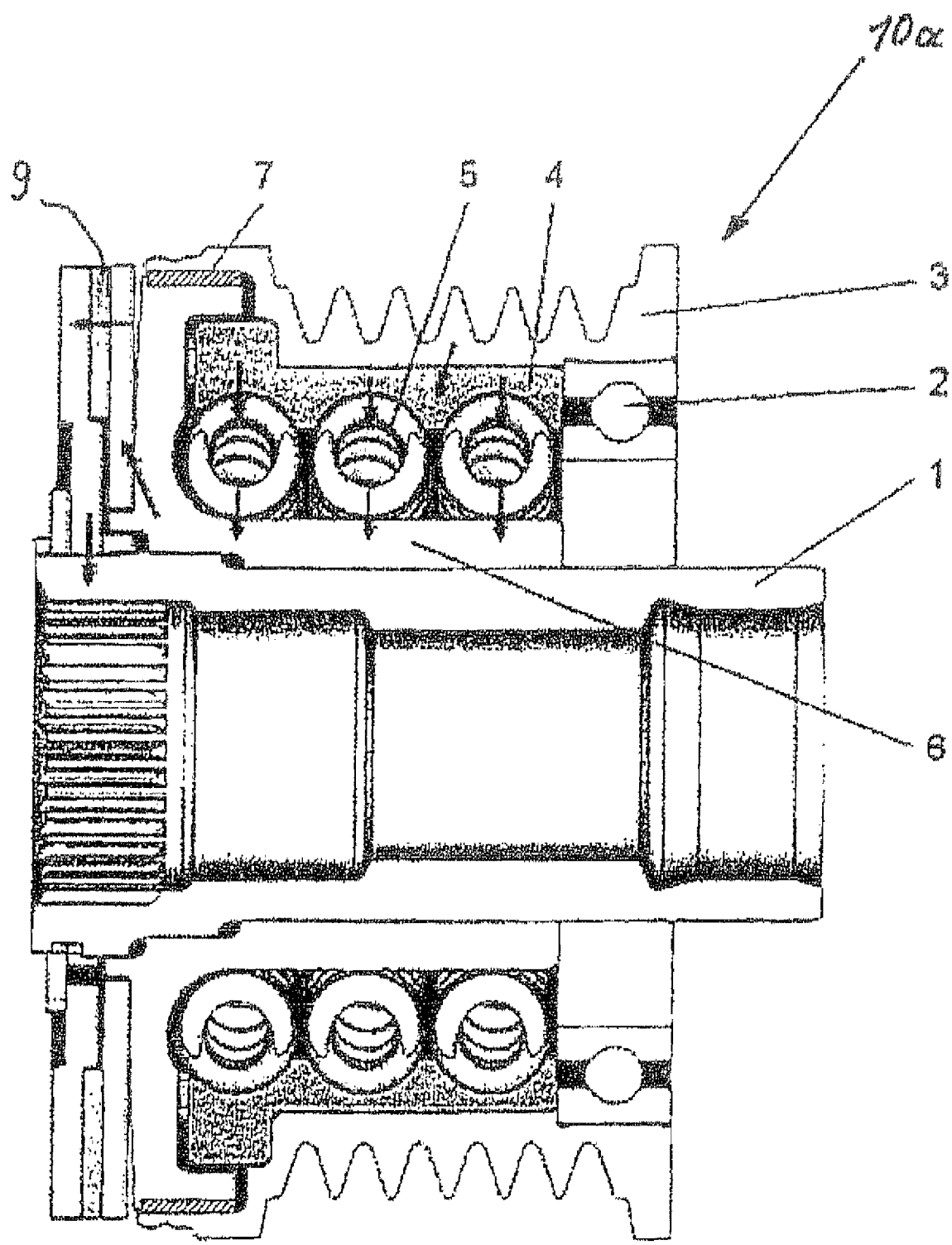
Figure 2:
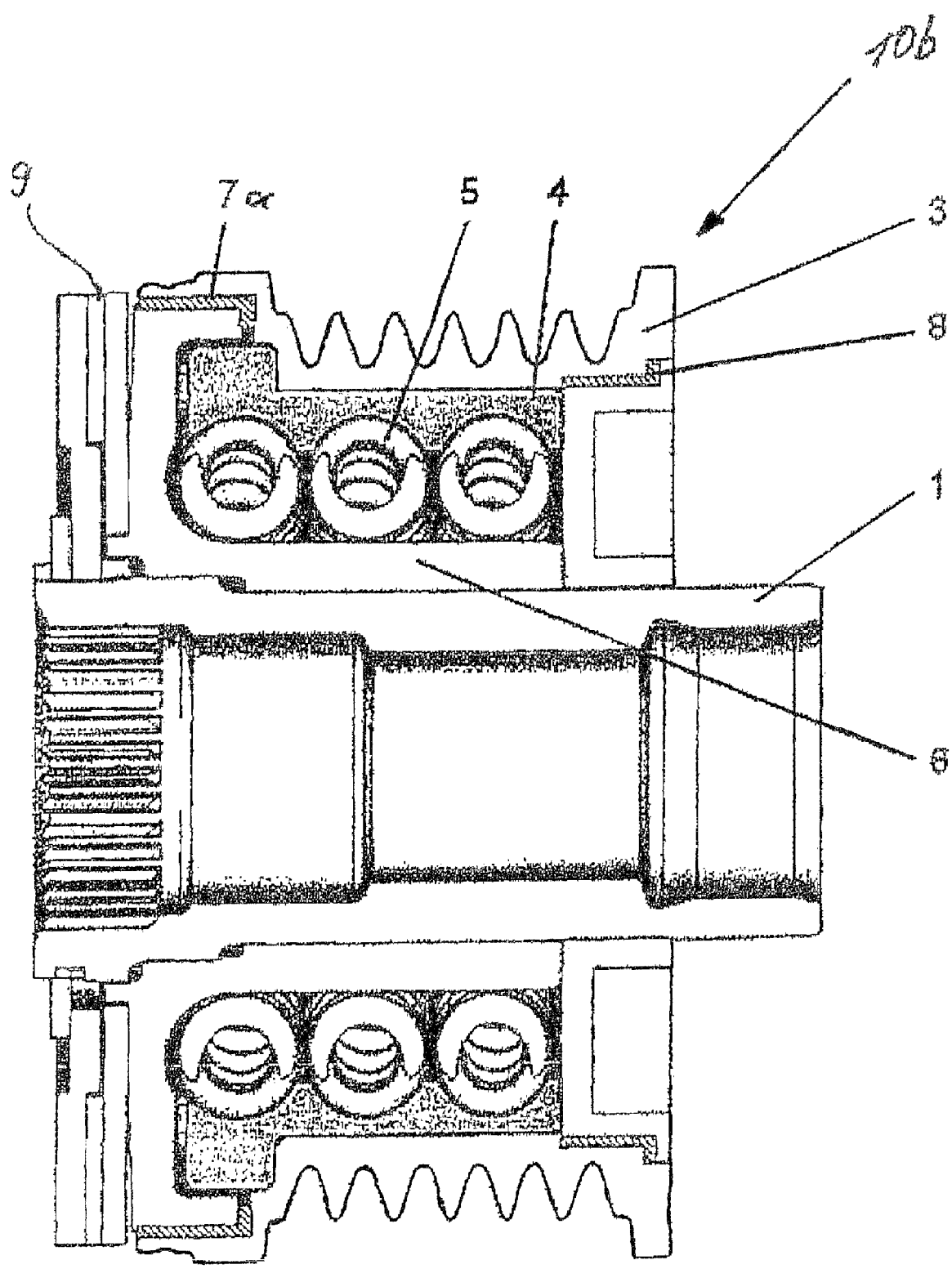

FIGS. 1 and 2 show exemplary embodiments of the invention.

The drive wheel 10a according to FIG. 1 comprises a belt pulley 3, which can also be referred to as a running surface, which is supported on a shaft 1 at one end via a rolling bearing 2. At the end situated opposite the rolling bearing 2, the belt pulley 3 is supported via a sliding bearing 7 which cooperates with a damper cage 6. A torque is transmitted from the belt pulley 3 to a first outer damper cage 4 by a form-fitting connection. From there, the torque is transmitted via a spring energy store 5, embodied as a bow spring, to an inner damper cage 6 centered on the shaft 1. A twisting of the damper cage 6 only takes place if, in the event of an overload, a slipping clutch 9, connected to the damper cage 6, slips. To illustrate the torque transmission from the belt pulley 3 to the individual components of the drive wheel 10a, various arrows indicating the torque flow are depicted in FIG. 1. The sliding bearing 7 can be embodied either by means of a conventional sliding bearing or without the use of a separate sliding bearing, for example by a suitable pairing of the materials of the components which are directly connected. In the case of the rolling bearing 2, various types of rolling bearings, such as, for example, spherical roller bearings or needle bearings, can be used. In an advantageous embodiment of the invention, provision is made for the bearing point or the rolling bearing 2 to be simultaneously configured as an axial guide for the belt pulley 3.

As an alternative to the representation shown in FIG. 1, there is the possibility of providing a mirror-inverted arrangement of the rolling bearing 2 and the sliding bearing 7. In a further design variant, provision is made for the inner ring of the rolling bearing 2 to be fastened on the end face to the damper cage 6 and for the outer ring to be arranged on the belt pulley 3, instead of a sliding bearing 7.

FIG. 2 shows in a further exemplary embodiment the drive wheel 10b in which the belt pulley 3 is mounted via two sliding bearings 7a and 8 which are designed to correspond to one another in such a way as to obtain an axial guide for the belt pulley 3.

LIST OF REFERENCE NUMBERS

1 Shaft
2 Rolling bearing
3 Belt pulley (running surface)
4 Damper cage
5 Spring energy store
6 Damper cage
7a Sliding bearing
7b Sliding bearing
8 Sliding bearing
9 Overload clutch
10a Drive wheel
10b Drive wheel

The invention claimed is:

1. A drive wheel arrangement for an auxiliary unit of an internal combustion engine, comprising:
    a belt pulley operatively connected to a flexible drive element and a shaft,
    a damping device is arranged between the shaft and the belt pulley and includes at least one spring energy-storing element, wherein the belt pulley is connected in a form-fitting manner to two bearings and an outer damper cage which is connected via the spring energy-storing element to an inner damper cage, the inner damper cage being rotatable on the shaft and having at least one sidewall that partially surrounds the spring energy storing element and an external face of the outer damper cage, one of the two bearings is a sliding bearing which is fixed between the belt pulley and the external face of the inner damper cage and the other of the two bearings is fixed at the opposite end of the drive wheel, between the belt pulley and the shaft.

2. The drive wheel arrangement according to claim 1, wherein the outer damper cage comprises at least two spring energy-storing elements connected in parallel.

3. The drive wheel arrangement according to claim 1, wherein the inner damper cage is operatively connected to an overload clutch.

4. The drive wheel arrangement according to claim 1, wherein the spring energy-storing element used is a bow spring.

5. The drive wheel arrangement according to claim 1, wherein the other of the two bearings is a rolling bearing.

6. The drive wheel arrangement according to claim 1, wherein the other of the two bearings is a sliding bearing.

* * * * *